United States Patent [19]

Gunn et al.

[11] 4,091,629

[45] May 30, 1978

[54] MARINE PIPELINE INSTALLATION SYSTEM

[76] Inventors: Charles R. Gunn, 312 Saturn Rd., Bayou Vista, La. 70380; Rayburn Bushnell, Rte. 7, Box 295, Lake Charles, La. 70601

[21] Appl. No.: 786,500

[22] Filed: Apr. 11, 1977

[51] Int. Cl.² .................. B23B 35/04; F16L 1/00; E02F 5/02
[52] U.S. Cl. ..................................... 61/72.4; 61/72.6
[58] Field of Search .................. 61/72.4, 72.6, 105, 61/106; 37/61, 62, 193, 69

[56] References Cited

U.S. PATENT DOCUMENTS

| | | | |
|---|---|---|---|
| 2,795,111 | 6/1957 | Richardson | 61/72.4 |
| 2,879,649 | 3/1959 | Elliott | 61/72.4 |
| 3,338,059 | 8/1967 | Tittle | 61/72.4 |
| 3,347,054 | 10/1967 | Sherrod | 61/72.4 |
| 3,423,946 | 1/1969 | Maclay | 61/72.4 |
| 3,462,963 | 8/1969 | Moore | 61/72.4 |
| 3,576,111 | 4/1971 | Henry | 61/72.4 |
| 3,751,927 | 8/1973 | Perot | 61/72.4 |
| 4,011,727 | 3/1977 | Suzuki et al. | 61/72.4 |

*Primary Examiner*—Dennis L. Taylor

[57] ABSTRACT

An apparatus and system for simultaneously laying and burying pipelines as they are constructed in an offshore marine environment which apparatus is comprised of a rigid structural frame having skids to contact the ocean floor as the device is propelled thereacross. A plow on the frame having a knife edge shear blade at its frontal portion cuts and parts the ocean floor forming a ditch. The plow is vertically adjustable (to control the depth of cut) and pivotally adjustable (to control the angular attitude of the plow with respect to the supporting frame). A combined water and air sparge trails in the ditch created by the plow and agitates the sediment falling back into the ditch to prevent the permanent settlement of solid matter in the ditch prior to placement of the pipeline therein. The ditch is thus retained in an open configuration facilitating easy installation of a pipeline therein. Structural vertical supports have adjustable guide members thereon to supportably receive the pipeline as constructed from a lay barge or like construction platform and guide the pipeline into the trench created by the device, as the device is pulled along by the lay barge, thus combining the pipe laying and burying operation into one relatively high speed process.

27 Claims, 8 Drawing Figures

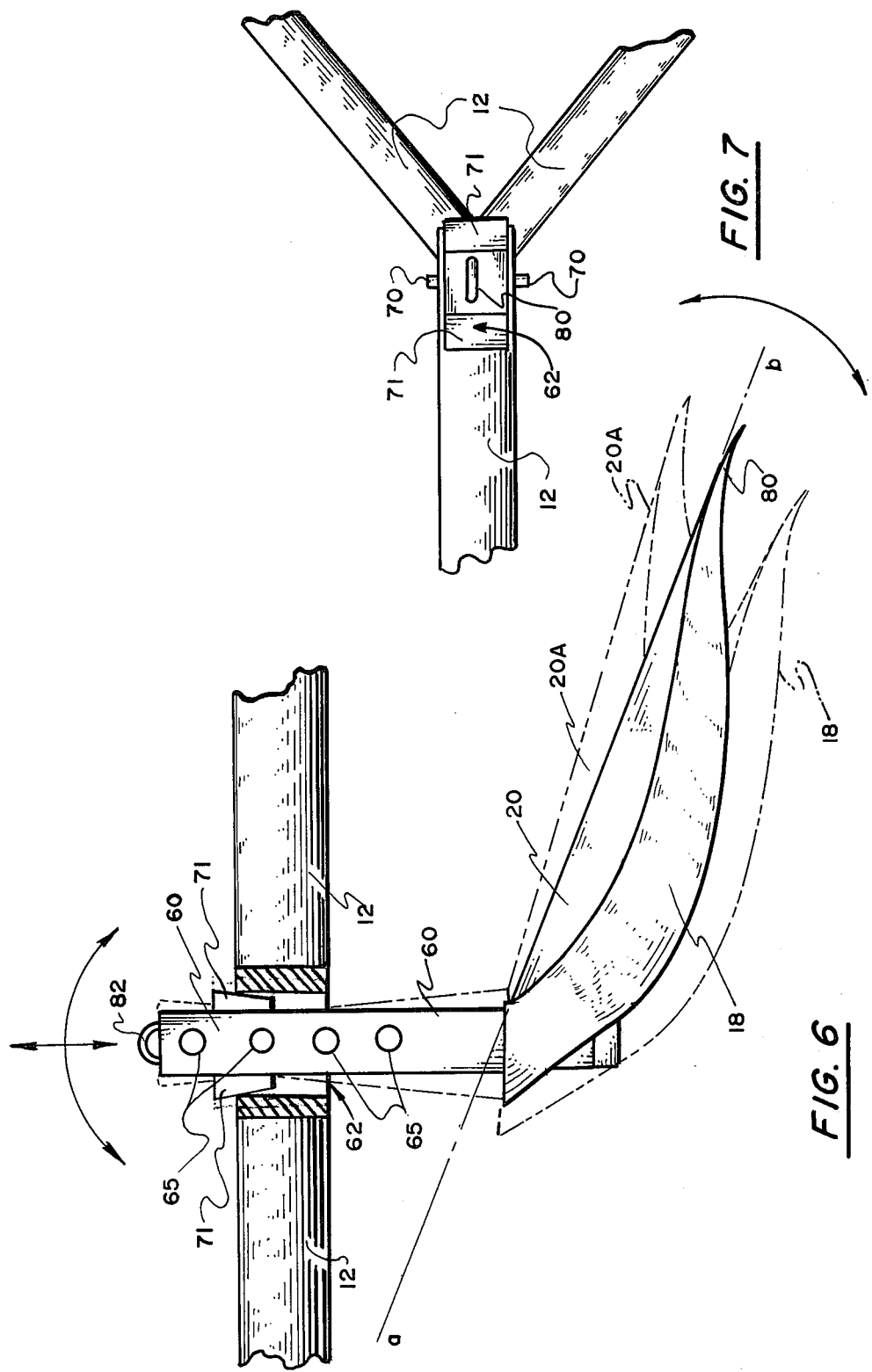

MARINE PIPELINE INSTALLATION SYSTEM

BACKGROUND OF THE INVENTION

1. Field of the Invention

The present invention relates to the installation of pipelines in a marine environment, and more particularly relates to an apparatus which supportably receives a pipeline after construction on a lay barge and supportably guides the pipeline to the ocean floor where the pipeline is then deposited continuously into a ditch which is continuously plowed and cleaned by the device during the laying operation.

2. General Background and Prior Art

Pipelines are required for the transmission of many products in our industrial society. Generally such products are fluid, but can be any flowable matter such as slurries and the like.

Pipelines have been used extensively in the transmission of products across a marine environment where other types of transportation would be impossible, highly expensive or not adequate to carry sufficient quantities. This is true of many products mined offshore which are not easily confineable and thus are especially suited to transmission through pipelines, for example, petroleum products, gas, oil and the like.

It is to this general field that the present invention is directed.

An offshore pipeline is widely used to transmit petroleum products and the like from offshore oil and gas fields inward, to consumer markets. Construction can be very costly as the marine environment is a difficult environment in which to construct anything. In fact, most offshore oil rigs are constructed inland and set in place after completely built, by hugh derrick barges. This procedure is not possible with pipelines which are not structurally sound enough to be totally built on land and thereafter laid in place. On some lines of relatively short length, they can be constructed onshore and pulled offshore through a ditch into place, but in the majority of marine installations, fabrication onsite is required. The "pulling" of a pipeline is also adjacent feasible where bottom sediment conditions cause any constructed ditch to rapidly fill in.

The installation of pipelines in a marine environment generally utilizes a barge structure known as a "lay barge" on which welders and like workmen construct the pipeline joint by joint and continuously feed the welded line off the end portion of the lay barge towards the ocean floor where it rests to be buried by natural sedimentation. Joints are usually relatively short (a 40 foot joint being typical). Thus joints can easily be stacked and sequentially welded tip to tip as the pipeline is lowered toward the ocean floor off the tail end of the barge. Thereafter, a second rig drags a "jet sled" along the line to bury the line in place. A ditch is prepared by the sled which the sled usually digs as it is propelled along the pipeline, either by gripping the line itself or by means of a vessel which imparts necessary tension to the sled to give it forward motion.

This method is extremely costly, complex and time consuming. When a jet sled is required to both dig the trench and bury the line after expenses have already been incurred to lay the line on the bottom, a great deal of unnecessary expense arises in the cost of construction which must ultimately be borne by the consumer in the form of higher fuel costs.

Several devices have been patented which have attempted to solve the problem of constructing and burying pipelines in the marine environment.

The devices usually require some mechanism to remove soil or sediment in order to form a ditch, and often a second mechanism to clean the ditch and prevent sedimentation back into the ditch.

The following table lists a number of prior art devices which have been patented, which devices utilize some type of plow to assist in forming an excavation into which a pipe or cable will be placed in a marine environment.

| PRIOR ART PATENTS USING A PLOW STRUCTURE | | |
| --- | --- | --- |
| U.S. Pat. No. | INVENTOR(S) | ISSUE DATE |
| 2,693,085 | I. S. Salnikov | Nov. 2, 1954 |
| 2,795,111 | L. W. Richardson | June 11, 1957 |
| 2,875,585 | T. R. Little | Mar. 3, 1959 |
| 2,992,537 | L. Callahan | July 18, 1961 |
| 3,339,368 | Takuji Ezoe et al | Sept. 5, 1967 |
| 3,368,358 | H. A. Elliott | Feb. 13, 1968 |
| 3,504,504 | H. A. Elliott | Apr. 7, 1970 |
| 3,540,226 | B. L. Sherrod | Nov. 17, 1970 |
| 3,641,780 | A. N. Ede | Feb. 15, 1972 |
| 3,824,798 | K. Shiroyama, et al | July 23, 1974 |

The following table lists other ditching marine devices which have been patented.

| PRIOR ART PATENTS | | |
| --- | --- | --- |
| U.S. Pat. No. | INVENTOR(S) | ISSUE DATE |
| 3,103,790 | N. P. Popich | Sept. 17, 1963 |
| 3,217,499 | I. Ishiki | Nov. 16, 1965 |
| 3,333,432 | A. L. Hale et al | Aug. 1, 1967 |
| 3,338,059 | J. G. Tittle | Aug. 29, 1967 |
| 3,423,946 | J. C. Maclay | Jan. 28, 1969 |
| 3,429,131 | C. F. Martin | Feb. 25, 1969 |
| 3,507,345 | D. R. Vaughan et al | Apr. 21, 1970 |
| 3,576,111 | U. A. Henry, Jr. | Apr. 27, 1971 |
| 3,717,003 | H. J. Bates, et al | Feb. 20, 1973 |
| 3,722,224 | L. H. Roy | Mar. 27, 1973 |
| 3,732,700 | R. P. Lynch | May 15, 1973 |
| 3,751,927 | J. C. Perot, Jr. | Aug. 14, 1973 |
| 3,786,642 | A. E. Good, et al | Jan. 22, 1974 |
| 3,803,856 | F. Galdi | Apr. 16, 1974 |
| 3,877,237 | R. M. Norman | Apr. 15, 1975 |
| 3,877,238 | N. M. Chang, et al | Apr. 15, 1975 |
| 3,898,852 | Takuji Ezoe, et al | Aug. 12, 1975 |
| 3,926,003 | R. M. Norman | Dec. 16, 1975 |

In most of the prior art patents which use a "plow", the plow structure straddles the pipe, the pipe having been prelaid on the ocean floor. The Sherrod U.S. Pat. No. 3,540,226, however, receives the pipe directly from the barge and lays it in a formed trench in the same operation. However, Sherrod teaches the use of an extensive, bulky "ballast train" for support of the pipeline. Such a ballast train is not required with the present invention, as the pipeline receives substantially all its support from the vertical supports provided on the structural frame portion of the sled itself. Such a ballast train would be undesirable in deep water or water with heavy currents in which control of such a ballast train would be impossible.

Devices of the prior art are for the most part complex, expensive, and awkward. Many have the major drawback of entirely too many moving parts to be useable in an underwater environment which is both corrosive and abusive to equipment. In addition to having an excessive number of moving parts, many prior art devices require excessive energy to power various scrapers, augers, blasting nozzles, and the like which actually perform the trenching operation. The cleansing system used with each device to sweep the plowed ditch and keep it free of sediment is often comprised of expensive and power consuming pumps, eductors, and like sophisticated fluid moving devices. While these devices may in fact be successful in keeping the ditch clean of sediment, they are quite costly to operate and in their complexity often require a longer period of time to do the required job.

GENERAL DISCUSSION OF THE PRESENT INVENTION

The present invention provides an apparatus which preferably both lays the pipeline, and in the same operation, forms a ditch and buries it therein. The device is comprised of a rigid support frame or sled having a pair of spaced sliding pontoons which can be equipped with air tanks to provide some buoyancy to the device and thus lessen friction on the ocean floor. Vertical support members on the frame are equipped with rollers to supportably receive the pipeline which is fabricated above and draped through the water across the rollers and into the ditch which the device prepares.

The ditch is initially formed by means of a ditching plow which is provided with a forward shear blade for initially splitting the soil of the ocean floor before the plow parts the soil and forms the ditch. Mud blades behind the plow catch the spoil from the plow and push it laterally, thus enlarging the ditch.

A sparge attached to the frame is oriented to follow the bottom portion of the ditch and lay therein, agitating the soil and water within the ditch so as to discourage settlement and filling of sediment and spoil into the ditch. A plurality of airlifts have their openings adjacent the sparge and assist in moving sediment from the ditch, thus keeping it clean.

The sparge follows the center line of the ditch thus having its location in substantially the spot where the pipe will ultimately lay. In fact, the length of the sparge is such that it sits in the centerline of the ditch laying horizontally in the ditch beginning approximately directly behind the ditching plow and continuing a distance beyond the end of the frame until in close proximity to the point at which the pipeline is entering the ditch itself. It can be seen from the above, that this structure thus minimizes the time in which a given portion of the ditch is without either the sparge to agitate the sediment or the pipeline laid therein as desired. Once the pipeline is in the ditch, of course, sedimentation is desirable as it then gradually covers the pipe. Since the device uses no movable augers, scrapers, pumps or the like to dig the ditch itself, energy is not continuously wasted when the lay barge is idle or momentarily stopped (as between the laying of joints when welding occurs). The device only requires energy for operation when the lay barge moves to discharge an additional length of pipe which has been welded to the pipeline. At this time the device is like a "parasite" — stealing a minor amount of energy from the huge winches which must move the lay barge itself, as the device is attached to and moves with the lay barge (note FIG. 1).

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 6 is a side view of the ditching plow portion of the preferred embodiment of the apparatus of the present invention showing the structural supporting frame in phantom lines; and FIG. 7 is a detail top view of the plow-frame attachment joint portion of the preferred embodiment of the apparatus of the present invention.

DETAILED DESCRIPTION OF THE PREFERRED EMBODIMENT

Structure

Figures 1, 1A:
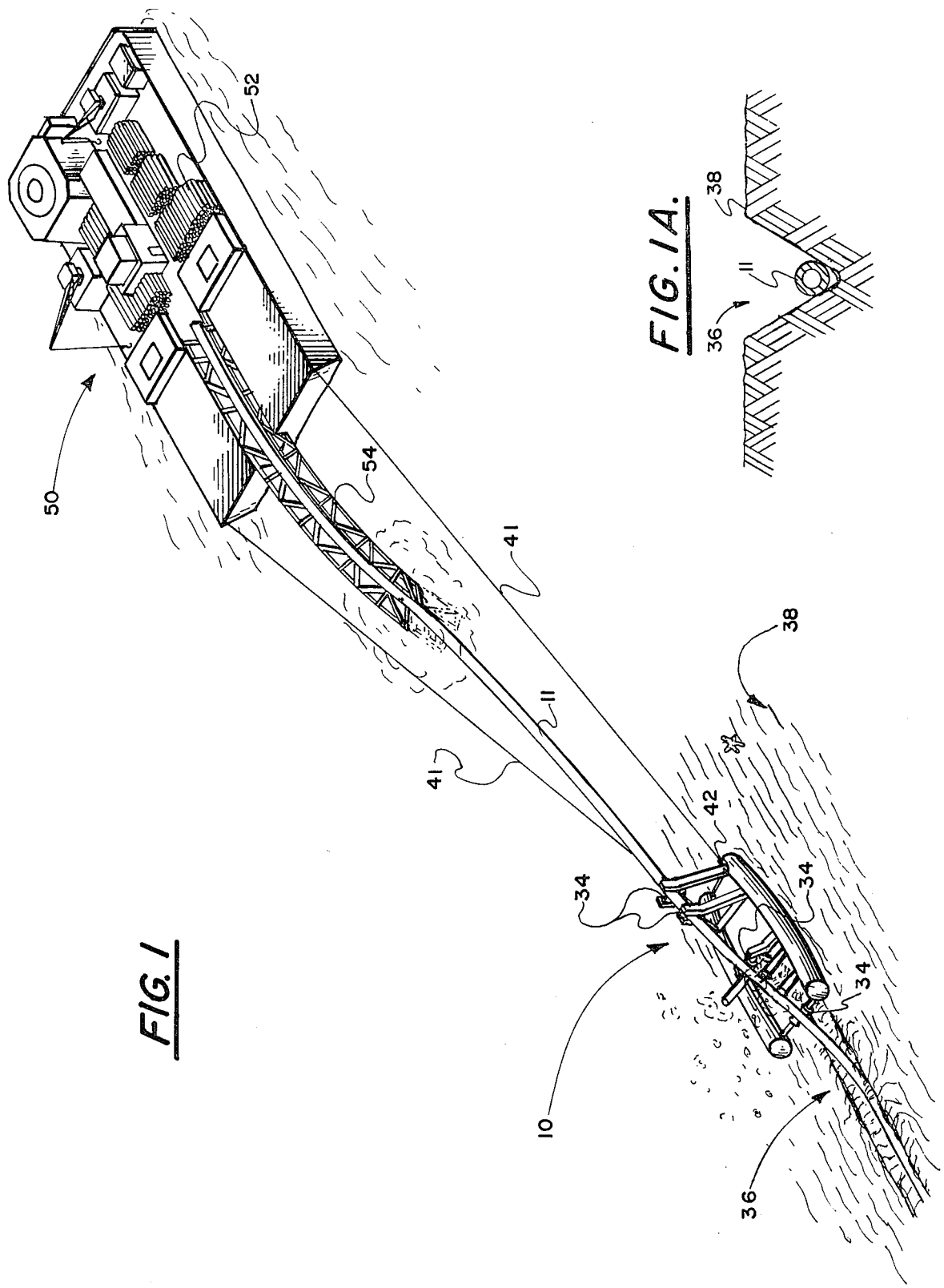
FIG. 1 is an overall, perspective view of the preferred embodiment of the apparatus of the present invention working behind a conventional lay barge in its marine environment.
FIG. 1A is a sectional view of a typical ditch formed by the preferred embodiment of the apparatus of the present invention illustrating a pipeline placed therein.

FIG. 1 illustrates the preferred embodiment of the underwater ditching apparatus 10 of the present invention in a typical pipeline 11 installation operation.

The apparatus 10 is being pulled behind a conventional lay barge 50 and receives pipeline 11 therefrom as it is being fabricated. Pipeline 11 is constructed on lay barge 50 from joints 52 which are stored thereon. As the welders make the welded connections between joints 52, the pipeline is supportably strung out from stringer 54 and guideably directed towards ditching apparatus 10 where the pipeline 11 is received thereon by rollers 34. The pipeline 11 then is guideably placed into the ditch 36 which is plowed and cleansed as the apparatus 10 is pulled behind the lay barge 40 as will be discussed more fully hereinafter. Thus, the operation of digging the ditch and placing the pipeline 11 therein is not an additional function requiring a second vessel and burying apparatus, but is coincident with and at the same speed as the pipe fabricating and laying operation itself.

This represents a significant advance over the prior art devices, and provides an economic savings to the consumer ultimately because of lower construction costs associated with the pipeline construction itself.

Figure 2:
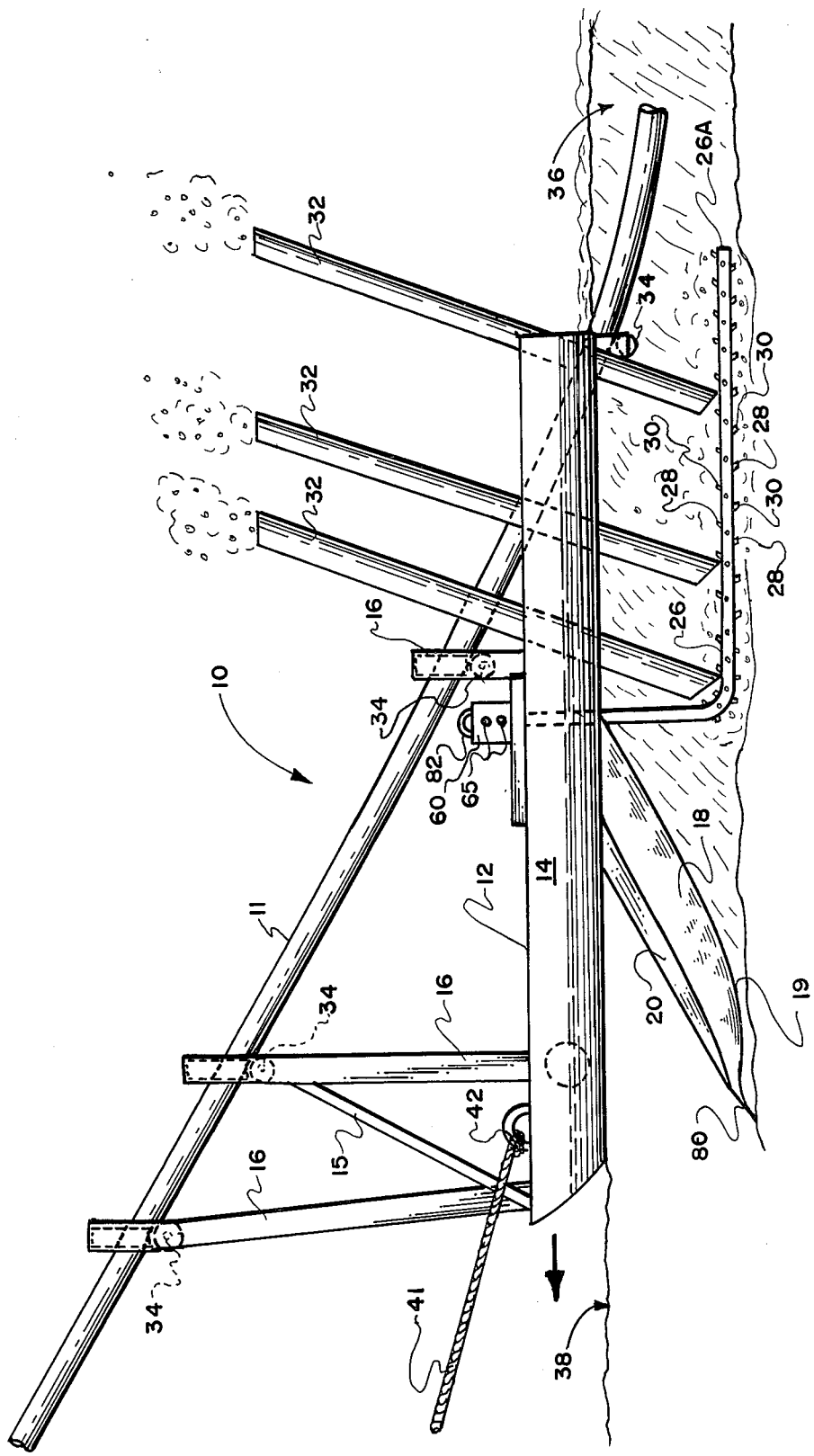
FIG. 2 is a side, elevational view of the preferred embodiment of the apparatus of the present invention illustrating the ditching and pipelaying operation.
Figure 3:
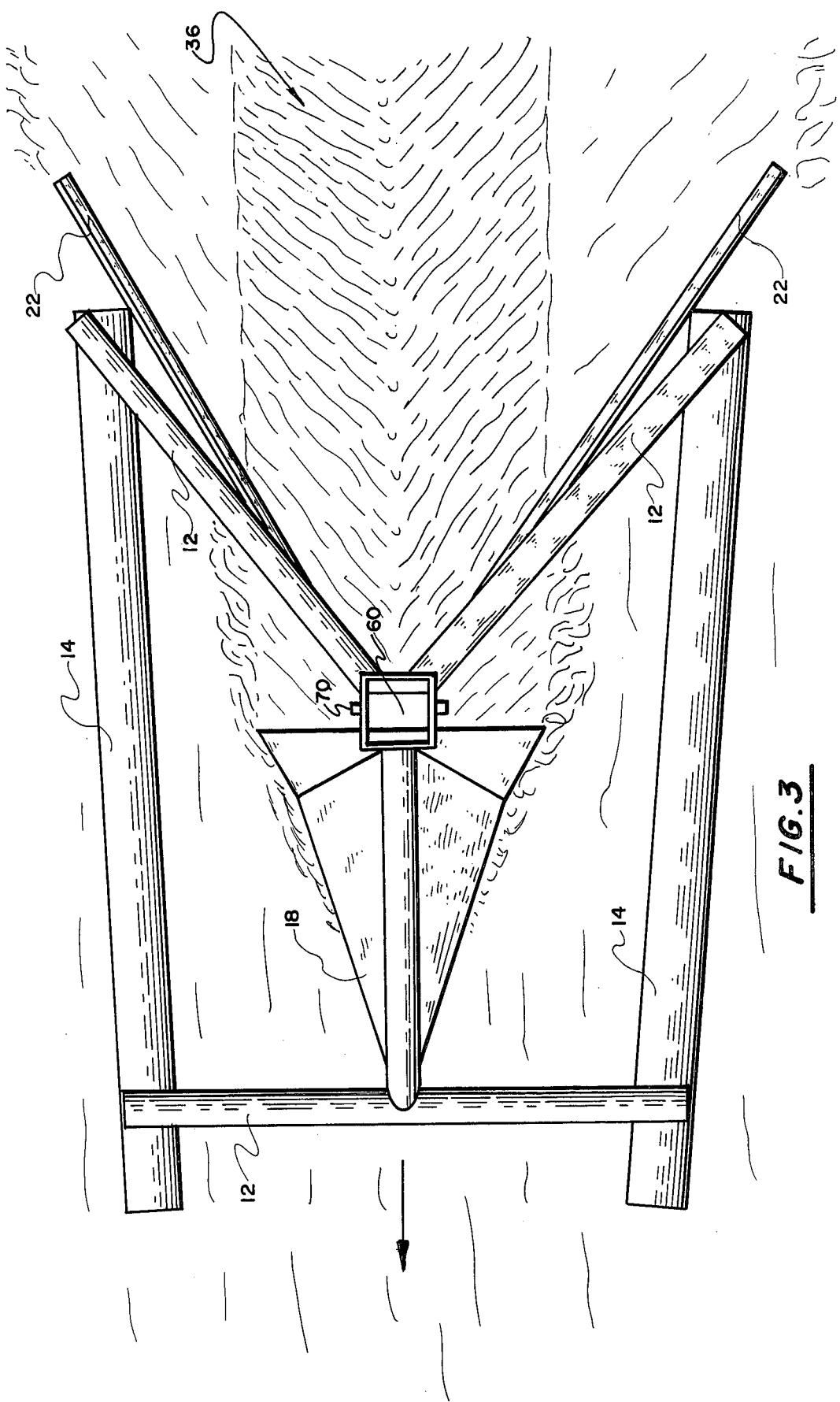
FIG. 3 is a top view of the preferred embodiment of the apparatus of the present invention.
Figure 4:
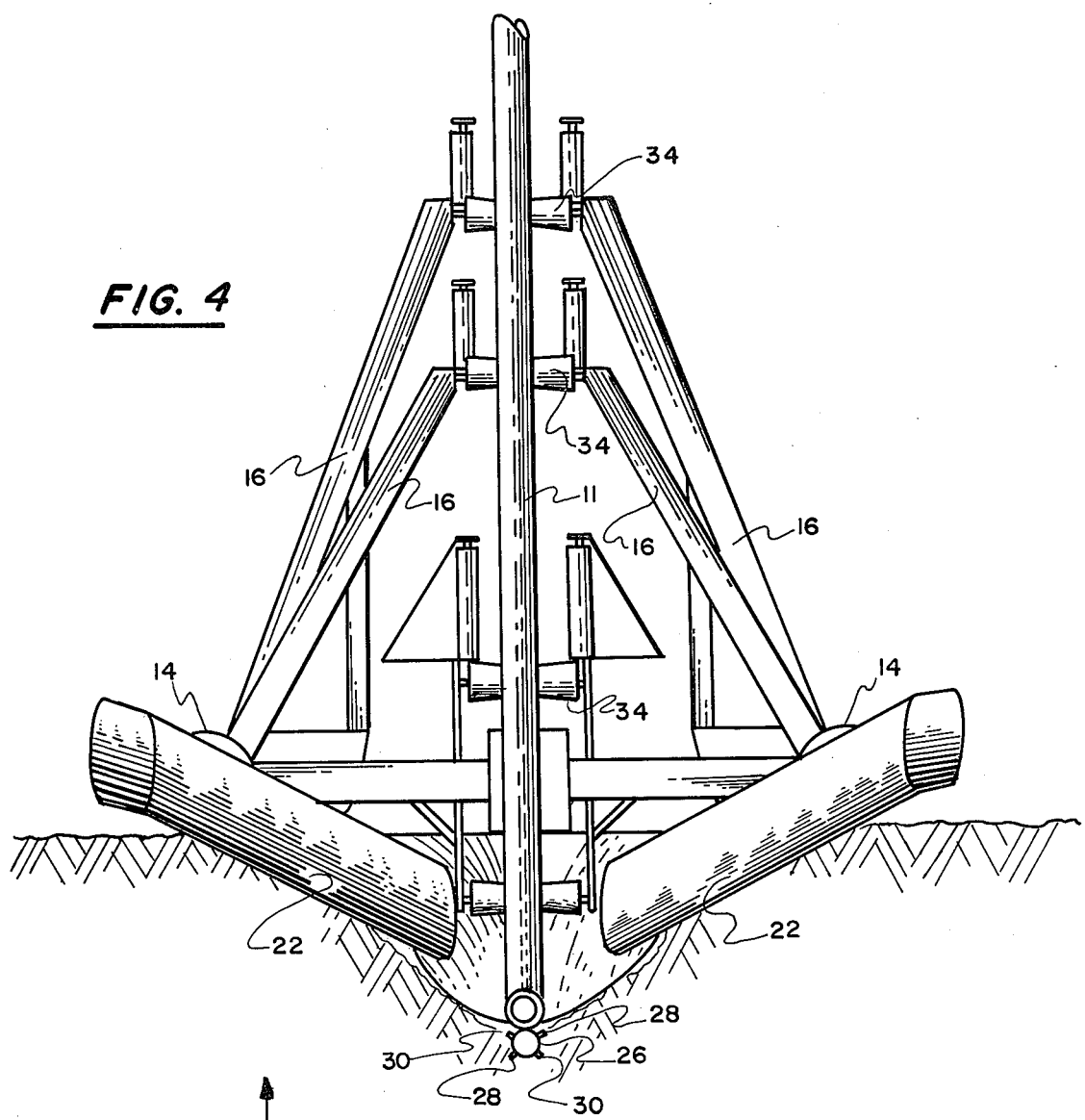
FIG. 4 is a rear view of the preferred embodiment of the apparatus of the present invention.

FIGS. 2–4 illustrate more particularly the structure of the preferred embodiment of the ditching apparatus 10 of the present invention. The device is comprised of a structural frame 12 having two pontoon skid members 14 and connective braces 15 added for structural strength. Pontoons 14 can have air tank portions which can be used to give buoyancy to the device and thus minimize friction between the frame 12 and the ocean floor 38 if desired. Vertical support members 16 are rigidly affixed to sled 12 and are braced by members 15 to minimize movement. Each vertical support member 16 is provided with a pipe roller 34 which is vertically adjustable on vertical support 16, thus allowing the device to receive a pipeline at substantially any angle from lay barge 50. Pipeline 11, as can best be seen in FIG. 2, is thus received from lay barge 50 and is guidably placed in ditch 36 as the device progresses.

The ditch portion 36 into which pipeline 11 is placed is initially formed using ditching plow 18. Plow 18 is provided with a forward shear blade 20 to minimize friction in the initial formation of the ditch as the shear blade 20 parts the soil of the ocean floor 38 ahead of plow 18. Plow 18 provides the second step in the formation of the ditch as it parts the soil further which has been cut by shear blade 20. Sediment which has been parted by plow 18 is further removed, enlarging the ditch as it is caught and pushed outwardly by spoil sweeps 22 (see FIG. 3).

Figure 5:
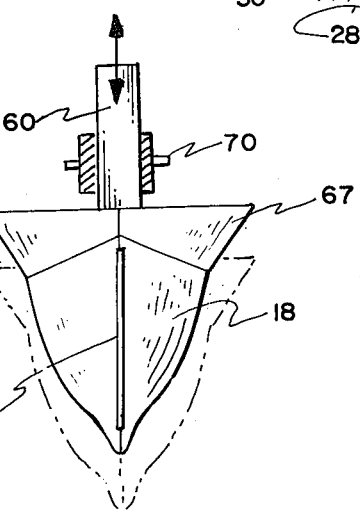
FIG. 5 is a frontal detail view of the plow portion of the present invention illustrating its vertical adjustability.

FIGS. 5–6 illustrate with particularity the plow 18 of the preferred embodiment of the apparatus of the present invention. As can best be seen by FIGS. 5–6, plow 18 is provided with features which give it adjustability. Plow 18 is attached to a structural support column 60 which is receivable into socket 62 provided on frame 12. Column 60 is elongated and vertically slidable within socket 62. A plurality of adjustment holes 65 can be provided on column 60 which holes correspond to pin 70 insertable first through frame 12 and then through the appropriate adjustment hole 65. Thus it can be seen that the plow 18 can be raised and lowered as desired in order to form a deeper or more shallow ditch 36 as desired. A lifting eye 82 is provided on the uppermost portion of column 60 which allows the plow to be supported by a suitable cable which can be attached to any lifting means, such as for example, a dragline, crane or the like. Lifting eye 82 can be attached to column 60 by means of welding or the like.

A further adjustability to plow 18 is provided, which adjustability changes the angular orientation of plow 18 with respect to frame 12. As can best be seen in FIG. 6, the fit of column 60 within socket 62 is a "sloppy" one which allows the plow 18 to pivot somewhat on adjustment pin 70 which supports column 60 and attached plow 18. The placement of adjustment shims 71 within the side wall portions of socket 62 forms a tighter fit of column 60 within socket 62. It can be seen that varying thickness shims 71 will provide different angular orientations of column 60 within socket 62, which angular orientation will be amplified at the tip portion 80 of plow 18 (see phantom lines, FIG. 6). Thus, the leading edge portion 20a of shear blade 20 normally forms an angle of for example 30° with frame 12. With the adjustable feature of the apparatus of the present invention associated with plow 18, this angle can be adjusted up to, for example, 5° in either direction.

The tip portion 80 of plow 18 provides a shortened amount of excessive downward angular orientation as can best be seen by FIG. 6. This downward pointing tip 80 is important to assure that plow 18 will always "seek" a downward digging orientation. Thus if frame 12 with attached pontoons 14 incurs slight bumps or other unevenness on the ocean floor, the frontmost portion of pontoons 14 will lift when pontoons 14 first incur such unevenness. Without the frontmost tip portion 80 having its downward orientation, plow 18 would seek to follow the undesirable line into which it has been directed when pontoons 14 are raised upon hitting a bump, hill or like unevenness on ocean floor 38. This is especially true since the attachment to ditching apparatus 10 is by means of cables 41 to lay barge 50 which lay barge is at an elevation greater than that of ditching apparatus 10. Thus the tip 80 of plow 18 provides a means which continuously causes the plow to seek a greater depth notwithstanding any irregularities which may occur when the device 10 proceeds across the ocean floor 38. It is noted that to provide an excessive downward orientation of plow 18 overall, would not be desirable in that an excessive amount of stress and friction would develop between plow 18 and frame 12 and likewise an excessive amount of energy loss would be seen.

With the vertically and pivotally horizontal features of plow 18, the plow 18 can be utilized to dig ditches of varying depths (note FIG. 5). In an exemplary embodiment of ditching apparatus 10, plow 18 can be adjusted to dig ditches varying from 3 feet in depth to 6½ feet in depth, thus giving a 4½ foot adjustability to the plow 18 portion of the preferred embodiment of the apparatus of the present invention. The plow 18 could be constructed of any structural materials such as steel or the like, being fabricated by welding or like connective techniques. The plow could be an exemplary length of 10 feet having a height of 6 feet and a width of approximately 9 feet. A stiffening blade 67 could be provided in order to give plow 18 necessary strength to perform its ditching operations.

Spoil sweeps 22 (note FIG. 3) carry the spoil portion of the ditch away from the centerline thereof, thus preventing the settlement of soil and like particulate matter into the ditch bottom, which would make it unable to receive pipeline 11 sufficiently deep thereinto. Spoil sweeps 22 are preferably concave on the side facing forward, which side actually contacts mud sediment and the like. Additionally, as can best be seen by FIG. 4, mold boards 22 would be angularly oriented with respect to the horizontal ocean floor. Thus the inner portions of sweeps 22 would be dipped downwardly towards ditch 36 while the outermost edges would extend beyond the farthest edge portions of pontoons 14 and be raised. This would provide a spoil sweep 22 which would catch sediment and hold it in its concave face portions, allowing the mud to drift outwardly as sled 10 moves forward, with the entrapped mud eventually exiting spoil sweeps 22 at their outermost tip portions far away from ditch 36. Spoil sweeps 22 would preferably be located at the end portion of sled 10 and form a secondary means of removing some sediment from the area of ditch 36. These spoil sweeps 22 would work in combination with pontoons 14 to facilitate such spoil removal. Since pontoons 14 are angularly oriented with respect to one another, they likewise would aid in pushing some sediment, mud and the like away from the ditch 36 as sled 10 moves forwardly. Frame 12 could be, for example 30 feet long having an exemplary width at the front portion of sled 10 of 17 feet and an exemplary width at the end portion of sled 12 nearest mud blades 22 of 20 feet. Thus the pontoons 14 could have a difference in spacing of 3 feet from the bow to stern portions of sled 10.

An elongated sparge 26 is provided (see FIG. 2) which travels from a position near the bottom of plow 18 and immediately therebehind, to a distance beyond the end portion of sled 12. It can be seen that the sparge 26 lays in a position which is substantially coincident with the final position of the pipeline in the ditch. Since this position also is directly behind the lowermost bottom portion 19 of plow 18, the sparge immediately begins its travel in the ditch 36 through the center line, lowermost portion thereof, as the plow passes a given point. Pipeline 11 is placed in the lowermost portion of the ditch 36 at its center line in the position which has just been vacated by the tip portion 26A of sparge 26. Thus, the sparge 26 substantially occupies the majority of the center line of the ditch behind plow 19 which is unoccupied by the pipeline after the plow has passed.

It can be seen from the foregoing, that the time it takes for the pipeline to hit the bottom of the ditch 36 at a given point after plow 18 has passed this point is the time in which settlement of solids might take place into the ditch. Thus, agitation and removal of sediment from the ditch is necessary to keep it clean during the time in which the plow has passed but the pipeline has not yet touched it. With the present invention, employing sparge 26 to substantially occupy ditch 36 during this interval, air and water jets 28, 30 on sparge 26 churn up sediment and facilitate its removal through airlifts 32.

Operation

FIG. 1 shows the overall operation of the preferred embodiment of the apparatus of the present invention. FIG. 1 illustrates the device as used in conjunction with a conventional type lay barge designated by the numeral 50 in FIG. 1. The pipeline 11 is welded from a plurality of joints 52 which are welded end to end by conventional means and fed thereafter in a continuous pipeline off the end portion of lay barge 50 by means of stinger 54. Stinger 54 is a structural support member which prevents crimping of the pipeline and damage to the individual welds and joints. After the line leaves stinger 54, it is suspended in the marine environment for a distance until it contacts the pipe roller 34 of ditching apparatus 10. It is then supported by other rollers 34. The individual rollers can be vertically adjusted to accomodate the angle at which pipeline 11 is received in its descent toward the ocean floor 38 from lay barge 50 and stinger 54.

The ditching apparatus 10 itself is hooked at pad eyes 42 by means of conventional cables 41 to lay barge 50 (note FIG. 1) and moves therewith at the same speed. Thus, ditching apparatus 10 requires no additional means of power to propel it along ocean floor 38. The lack of need of auxiliary power is due primarily to the use of ditching plow 18 and shear blade 20 which substantially minimize the frictional drag which the device 10 creates on the lay barge 40 itself during construction of a suitable ditch 36.

Since the apparatus 10 is directly attached to the lay barge 50, and moves therewith, no energy is lost when lay barge 50 stops during the welding of a new joint. Thus, the energy waste problems seen in prior art devices which use continuous augers, nozzles, eductors, scrapers and the like is solved. The apparatus 10 receives its energy for forward movement from lay barge 50, "bleeding" minimal energy from the tugs or winches which must expend considerable energy to move lay barge 50 forward as the welding process continues. It can be seen from the above, that the device requires minimal attention and maintenance, and requires only the energy required to operate sparge 26 (described more fully hereinafter), which could be for example, a small diesel-type internal combustion engine powering appropriate pumps. No gripping of the pipeline is required, which can cause damage to protective anti-corrosive coatings on the pipe itself.

Buoyancy tanks can be added within pontoons 14 to lighten the overall load and thereby give the overall frame portion 12 a minimal desired buoyancy, thus limiting the drag to that of the plow itself. Plow 18 provides a ditch 36 into which pipeline 11 is quideably placed as it descends toward the ocean floor 38 on rollers 34. The apparatus 10 is provided with additional means to prevent the silting or filling of ditch 36 by sediment from the bottom 38 or from the spoil created by plow 18. Such means are in the form of spoil sweeps 22 sparge 26 and airlifts 32. When the plow initially forms ditch 36, it can be seen from an inspection of FIG. 2 that the ditch is quickly occupied immediately behind plow 18 by horizontal sparge 26 which then occupies linearly a position along the bottom of the ditch itself. The agitation of the sediment and fluids within trench 36 by sparge 26 produces a suspension of air; water and mud which is carried upwardly and outwardly away from the ditch by airlifts 32, as can best be seen in FIGS. 2 and 3.

By the time the end portion 26A of sparge 26 passes a given point, pipeline 11 is very shortly laid in the ditch at that point, thus minimizing the time in which silting can enter ditch 36 and fill it before pipeline 11 is placed thereinto.

Ditching apparatus 10 can be constructed of any structural material, preferably being coated with an anti-corrosive paint or the like. Thus, the device could be constructed of, for example, structural steel, having a painted or like coating which would resist salt water attack. Rollers 34 could be made preferably of any suitable, cushioned material such as hardened rubber, plastic or the like, which rollers would supportably guide the pipe towards ditch 36 and would not damage the pipe or its coating which may be relatively delicate. Sparge 26 could be constructed of conventional pipe materials, having an inner portion which would convey the air and water separately towards the jets 28, 30, respectively, mounted thereon.

Because many varying and different embodiments may be taught within the scope of the inventive concept herein taught and because many modifications may be made in the embodiment herein detailed in accordance with the descriptive requirements of the law, it is to be understood that the details herein are generally to be interpreted as illustrative and not in a limiting sense.

What is claimed as invention is:

1. A submarine pipeline installation apparatus for forming a ditch and for laying a generally rigid pipeline in the formed ditch from a surface vessel in a marine environment in a combined operation comprising:

a. a supportive, rigid frame adapted to travel on the water bottom;

b. ditch forming means attached to said frame on its lower side for forming the ditch for the generally rigid pipeline in the water bottom;

c. a series of aligned, supportive surface means for providing substantially all the structural support to the pipeline after the pipeline leaves the surface vessel but before the pipeline enters the ditch, said supportive surface means rigidly mounted on and carried by said frame on its upper side substantially above the operative portions of said ditch forming means, each successive one of said series being lower than or substantially equal to the height of the supporting surface of the preceding one of said supportive surface means, said supportive surface means being capable of movably and supportively receiving the generally rigid pipeline thereon and placing the generally rigid pipeline down in a continuously downward manner on the water bottom in the ditch substantially behind the operative portions of said ditch forming means; and d. towing means on said frame for connecting said frame to the surface vessel laying the pipeline for towing said frame with the vessel as it moves forward, the ditch being formed by said ditch forming means as said frame is towed forward by the surface vessel and the pipeline being simultaneously laid in the ditch from said supportive surfaces behind said ditch forming means, the ditching and laying operations for the pipeline being combined into one continuous operation without the operative portions of said ditching means having to straddle the pipeline.

2. The apparatus of claim 1 wherein there is further included:

sparge means attached to said frame and oriented to lie at the bottom portion of the ditch when said frame is traveling on the water bottom, the longitudinal axis of said sparge means following a path substantially coincident with the bottom centerline portion of the ditch and being substantially coincident to the final position of the pipeline to be placed in the ditch.

3. The apparatus of claim 2, wherein said sparge means is an elongated conduit through which air and water can be dispensed, said conduit being provided with a plurality of nozzles capable of dispensing said air and said water at a high rate of pressure to the area immediately ajdacent said conduit, said sparge means occupying a position substantially coincident with the final layed position of the pipeline which is to be placed in the ditch from said rollers, said sparge means lying in the ditch longitudinally between said ditching means and a point behind said ditching means which point had been traversed by said ditching means moving with said frame, said sparge means having a length such that it occupies substantially all of the ditch between said ditching means and the point of entry of the pipeline into the ditch.

4. The apparatus of claim 1, wherein said ditch forming means comprises plow means including a ditching plow.

5. The apparatus of claim 4 wherein said plow means is vertically adjustable with respect to said frame.

6. The apparatus of claim 5, wherein there is provided a plurality of adjustment stops on said plow means, and said stops register with and connect to said frame, the position of said plow being fixable at different elevations when said stops are individually registered with and connected to said frame respectively.

7. The apparatus of claim 4, wherein said plow means is pivotally adjustable about its central longitudinal axis whereby the front tip portion of said plow can be raised or lowered.

8. The apparatus of claim 7, wherein said plow means is comprised of:

a. a supportive vertical column;
b. a plow body affixed to said column; and
c. a shear blade attached to the front portion of said plow, said shear blade being capable of initially parting the soil encountered by said plow;

and said frame is provided with an opening therein, said opening receiving said column therethrough, said column making a loose fit within said opening, and there is further provided shim means placeable within said opening for adjusting the position of said plow within said opening.

9. The apparatus of claim 4, wherein there is further provided a downwardly angled tip portion on said plow.

10. The apparatus of claim 9, wherein said shear blade forms an angle of less than 45° with said frame.

11. The apparatus of claim 10, wherein said tip portion is substantially coincident with said shear blade.

12. The apparatus of claim 9, wherein said shear blade forms an angle of less than 30° with said frame.

13. The apparatus of claim 1, wherein said frame is comprised of:

a. a pair of ground contacting skids; and
b. an interconnective member structurally joining said skids.

14. The apparatus of claim 13, wherein said skids are pontoons, having buoyancy tanks within, and said buoyancy tanks are capable of receiving and holding pressurized gases therein.

15. The apparatus of claim 13, wherein said skids are skewed with respect to one another, the front portion of said frame having a slightly narrower width than the rear portion of said frame, whereby some sediment is urged away from the central portion of said frame when said frame travels across the water bottom.

16. The apparatus of claim 1, further comprising mold board means connected to said frame for urging sediment away from the ditch.

17. The apparatus of claim 16, wherein said mold boards are concave on the forward surface which contacts and urges the sediment during forward motion of said frame.

18. The apparatus of claim 1, wherein said supportive surface means comprise a plurality of supporting rollers, said rollers being capable of supportively receiving the pipeline thereon and being rotatable about horizontally, laterally disposed axes.

19. A submarine pipeline installation apparatus for forming a ditch in the water bottom for a pipeline in a marine environment comprising:

a. a supportive frame adapted to travel on the water bottom;
b. mechanical plow means with a lowermost tip portion attached to said frame on its lower side for physically and directly cutting into and removing soils from a portion of the water bottom to form a ditch for the pipeline by pushing the soil aside; and
c. sparge means attached to said frame for temporarily preventing re-entry of soil into the ditch, said sparge means being oriented for being at least generally longitudinally positioned within the ditch behind said plow means and in front of the portion of the ditch in which the pipeline is to be laid, said sparge means being an elongated, single pipe-like element attached to said frame and oriented horizontally behind and at least generally in line with the lowermost tip portion of said plow means, thereby occupying a position substantially coincident with the lowermost portion of the ditch formed by said plow means, which position will eventually be occupied by the pipeline.

20. The apparatus of claim 19, wherein said frame is provided on its upper side with a plurality of supporting rollers, said rollers being capable of supportively receiving the pipeline thereon.

21. The apparatus of claim 19, wherein said sparge means is comprised of at least one air jet being capable of creating a suspension of air and sediment within said ditch, and wherein there is further provided air lift means attached to said frame for removing said suspended sediment from the ditch.

22. The apparatus of claim 21, wherein said air lift means is comprised of at least one conduit, one end portion of said conduit being substantially adjacent said sparge means, the other end portion of said conduit being above and laterally offset from said sparge means.

23. The apparatus of claim 19, wherein said sparge means is provided with a plurality of water dispensing nozzles and a plurality of air dispensing nozzles, said nozzles being capable of creating a suspension of sediment within the ditch, and there is further provided air lift means on said frame downstream from the beginning of said sparge means for conveying said suspension of sediment away from the ditch.

24. The method of installing a generally rigid pipeline on the water bottom in a marine environment comprising the following steps:
   a. providing a surface vessel from which the pipeline is to be laid;
   b. providing a submarine pipeline installation apparatus on the water bottom, which installation apparatus includes a rigid frame having ditching means on its lower side for forming a ditch in the water bottom and a series of vertically declining, aligned, supportive surface means both above and behind said ditching means for movably and supportively receiving the generally rigid pipeline and laying it down substantially behind said ditching means, said supportive surface means being rigidly mounted on and carried by said frame on its upper side;
   c. running the formed pipeline from said surface vessel to said supportive surface means on said installation apparatus and ultimately to the water bottom substantially behind said ditching means with said supportive surface means providing substantially all the structural support to the pipeline after the pipeline leaves the surface vessel;
   d. simultaneously towing said installation apparatus behind said surface vessel at the same speed as the surface vessel is propelled forward as the pipeline is laid from said surface vessel to said installation apparatus to said water bottom;
   e. forming a ditch with said ditching means as said apparatus is towed into which ditch the pipeline is laid, and
   f. using said supportive surface means to guide the pipeline down in a continuously downward manner into said ditch from above substantially behind said ditching means, thereby combining the pipeline laying and the ditching operation into one simple, continuous, combined operation without the operative portions of said ditching means having to straddle the pipeline.

25. The method of claim 24 wherein in step "b" the apparatus is further provided with sediment upheaval and lifting means, and there is further included the following steps:

g. using in step "e" said sediment upheaval means to lift up the sediment produced in the ditching operation up out of and above the ditch; and
   h. allowing at least some of the lifted sediment to cover up the pipeline in the ditch after said installation apparatus has passed and the pipeline has been laid in the ditch.

26. The method of claim 25 wherein said ditching means includes a plow, and wherein in step "e" there is included the step of:
   pulling said plow through the water bottom to form said ditch.

27. A submarine pipeline laying and burying system for forming a ditch and for laying a generally rigid pipeline from the water surface in the formed ditch in a marine environment in a combined operation comprising:
   a. a surface vessel from which the pipeline is to be laid; and
   b. a pipeline ditching apparatus located on the water bottom with the pipeline extending in a natural catenary fashion from said surface vessel to said apparatus, said apparatus including
      (i) a supportive, rigid frame on the water bottom adapted to travel on the water bottom;
      (ii) ditch forming means attached to said frame on its lower side for forming the ditch for the generally rigid pipeline in the water bottom;
      (iii) a series of vertically declining, aligned, supportive surface means for providing substantially all the structural support to the pipeline after the pipeline leaves the surface vessel but before the pipeline enters the ditch, said surface means being rigidly mounted on and carried by said frame on its upper side substantially above the operative portions of said ditch forming means, said supportive surface means being capable of movably and supportively receiving the generally rigid pipeline thereon and placing the generally rigid pipeline down in a continuously downward manner on the water bottom in the ditch substantially behind the operative portions of said ditch forming means, said supportive surface means providing at least substantially all the support to the pipeline as it is suspended in at least substantially natural, catenary fashion between said surface vessel and said apparatus; and
      (iv) towing means on said frame for connecting said frame to the surface vessel laying the pipeline for towing said frame with the vessel as it moves forward, the ditch being formed by said ditch forming means as said frame is towed forward by the surface vessel and the pipeline being simultaneously laid in the ditch from said supportive surfaces behind said ditch forming means, the ditching and laying operations for the pipeline being combined into one continuous operation without the operative portions of said ditching means having to straddle the pipeline.

* * * * *